US006437960B1

(12) United States Patent
Chen et al.

(10) Patent No.: US 6,437,960 B1
(45) Date of Patent: Aug. 20, 2002

(54) CURRENT LIMITING CIRCUIT BREAKER WITH POSITIVE TEMPERATURE COEFFICIENT RESISTIVITY (PTC) ELEMENT AND INSERTABLE INSULATING OBJECT

(75) Inventors: William Weizhong Chen, Marion; Brett Eugene Larson; Bruce F. Lindholm, both of Cedar Rapids; Ron E. Stecker, Marion, all of IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/584,226

(22) Filed: May 31, 2000

(51) Int. Cl.[7] .................................................. H02H 5/00
(52) U.S. Cl. ......................... 361/103; 361/58; 361/93.1
(58) Field of Search .......................... 361/58, 106, 100, 361/103, 93.1

(56) References Cited

U.S. PATENT DOCUMENTS 4,880,948 A * 11/1989 Kandatsu et al. ........... 200/151
5,933,311 A * 8/1999 Chen et al. ................. 361/106

* cited by examiner

*Primary Examiner*—Stephen W. Jackson
(74) *Attorney, Agent, or Firm*—Kareem M. Irfan; Larry I. Golden

(57) ABSTRACT

The present invention provides a current limiting circuit breaker having a plurality of current responsive devices for opening a pair of contacts upon short circuit conditions. One such device is a conventional magnetic tripping mechanism. The other device utilizes an insulating object driven by a magnetic force caused by the short circuit current. Upon opening of the contacts with the use of the insulating object, let-through current flows through a secondary contact, positioned on the insulating object, to a positive temperature coefficient resistivity element which limits the current and arcing in the contacts. In an alternative embodiment, at least one steel component is added to increase the magnetic force, thereby providing a greater force on the insulating object. An insulation component is also added to further suppress any arc generated between the contacts when going from a closed state to an open state. In another alternative embodiment, the magnetic tripping mechanism is actuated by the device utilizing the insulating object driven by the magnetic force.

21 Claims, 4 Drawing Sheets

CURRENT LIMITING CIRCUIT BREAKER WITH POSITIVE TEMPERATURE COEFFICIENT RESISTIVITY (PTC) ELEMENT AND INSERTABLE INSULATING OBJECT

FIELD OF THE INVENTION

This invention relates to the use of current liming elements and positive temperature coefficient resistivity (PTC) elements in circuit breakers to limit the arcing and interruption pressure that results from the operation of a circuit breaker under short circuit conditions.

BACKGROUND OF THE INVENTION

Circuit breakers are widely used in residential and industrial applications for the interruption of electrical current in power lines upon conditions of severe overcurrent caused by short circuits or ground faults. One of the problems associated with the process of interruption of current during severe overcurrent conditions is arcing. Arcing occurs between the contacts of circuit breakers used to interrupt the current and is highly undesirable for several reasons. Arcing causes deterioration of the circuit breaker contacts and produces gas pressure within the circuit breaker. Arcing also necessitates circuit breakers have a larger separation between the contacts in the open position to extinguish the arc during high current faults. Prior art devices have used a number of approaches to limit the occurrence of arcing. For example, in heavy duty switchgear, the circuit breaker contacts may be enclosed in a vacuum or in an atmosphere of $SF_6$. Both of these approaches are expensive.

Another approach to limit the amount of arcing is the use of a resistor connected in parallel with the contacts of the circuit breaker. Upon opening of the contacts, current can flow through the shunt resistor, effectively reducing the amount of arcing in the contacts. The current flowing through the resistor is less than the short circuit current that would flow through the contacts in the absence of the resistor.

A current limiting circuit breaker or current limiter typically can provide limitation to the let-through current during a short circuit. The current limiter can interrupt a short circuit before the available current reaches zero. In other words, the current limiter can dramatically reduce both the peak current ($I_p$) and the let-through energy ($I^2t$) values compared to conventional circuit breakers. In conventional current limiting breakers, almost 100% of the interruption energy goes to generate arc and pressure upon a short circuit. In an attempt to address this problem and to achieve the above current limitation functions, costly components are being added to conventional circuit breakers.

The present invention provides for a cost efficient manner to increase current limitation effectiveness and decrease the interruption pressure within the circuit breaker, thereby improving the interruption rating of the circuit breaker and greatly reducing the potential damage to end-use equipment. Therefore, this invention allows for the design of better performing and less expensive current limiters than conventional current limiting circuit breakers.

SUMMARY OF THE INVENTION

The present invention provides a current limiting circuit breaker having a plurality of current responsive devices for opening a pair of contacts upon short circuit conditions. One such device is a conventional magnetic tripping mechanism.

The other device utilizes an insulating object driven by a magnetic force caused by the short circuit current. Upon opening of the contacts with the use of the insulating object, let-through current flows through a secondary contact, positioned on the insulating object, to a positive temperature coefficient resistivity element which limits the current and arcing in the contacts. In an alternative embodiment, at least one steel component is added to increase the magnetic force, thereby providing a greater force on the insulating object. An insulation component is also added to further suppress any arc generated between the contacts when going from a closed state to an open state. In another alternative embodiment, the magnetic tripping mechanism is actuated by the device utilizing the insulating object driven by the magnetic force.

Examples of the more important features of the invention have been summarized rather broadly in order that the detailed description thereof that follows may be better understood, and in order that the contributions to the art may be appreciated. There are additional features of the invention that will be described hereinafter and which will form the subject of the claims appended hereto.

BRIEF DESCRIPTION OF THE FIGURES

For a detailed understanding of the present invention, references should be made to the following detailed description of the preferred embodiment, taken in conjunction with the accompanying drawings, in which like elements have been given similar numerals, and wherein.

DETAILED DESCRIPTION OF THE INVENTION

Figure 1:
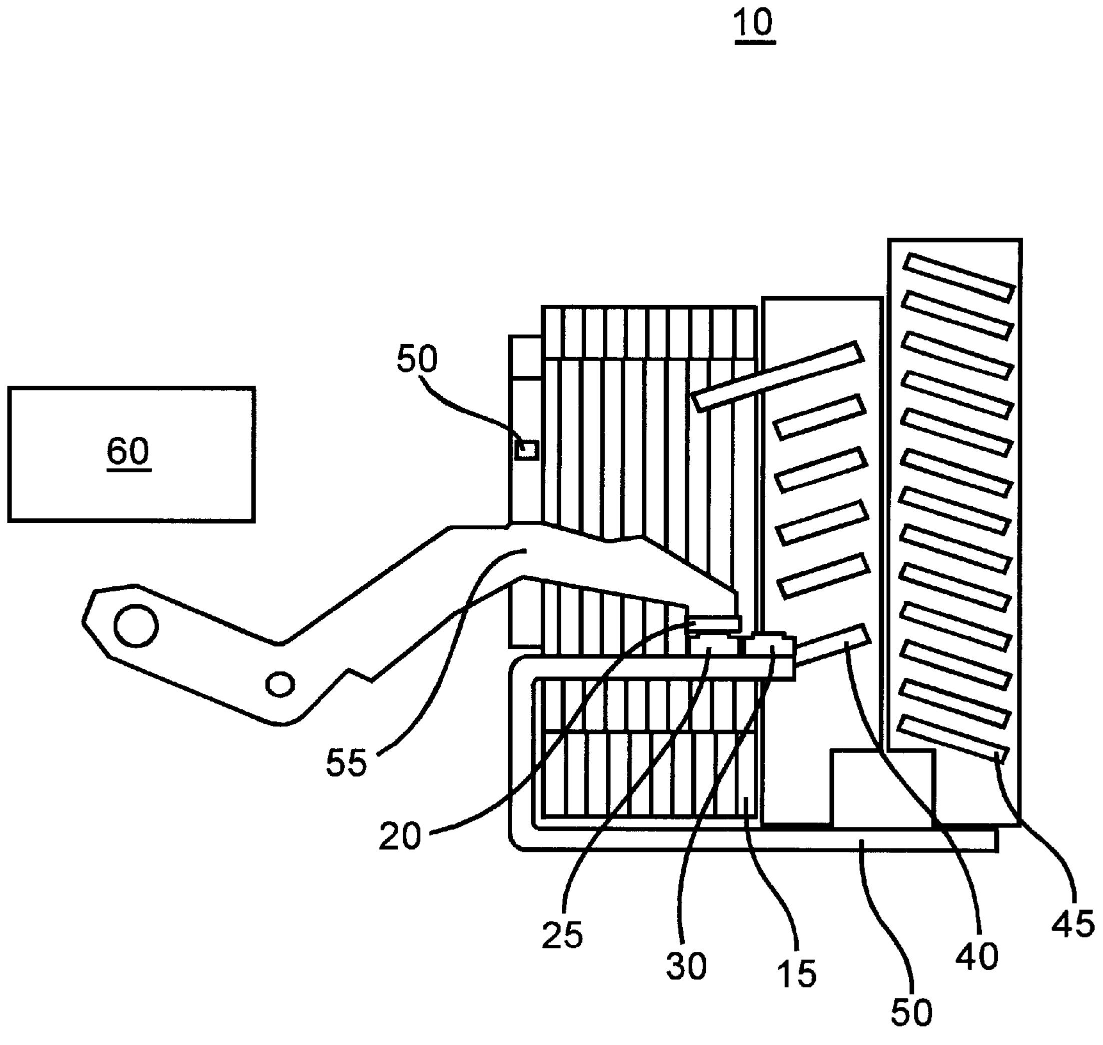
FIG. 1 illustrates a prior art current limiting circuit breaker.

FIG. 1 shows a prior art device wherein an "O" magnet 15 is placed around a movable contact 20 and a stationary contact 25. An arcing contact 30 is placed side by side with the stationary contact 25. Both the stationary contact 25 and the arcing contact 30 are welded on a line terminal 35. An assembly of arc stack 40 and an assembly of baffle stack 45 are used in the arc chute (not shown). A catcher 50 is placed across a blade 55 and at the back side of the "O" magnet 15. A magnetic tripping mechanism 60 of the circuit breaker 10 is responsive to current flow and is adapted to move the moveable contact 20.

Under normal operation, current flows from the line terminal 35, through the stationary contact 25 and movable contact 20 and then through the blade 55. When a short circuit occurs, the "O" magnet 15 increases the blowing off force of the blade 55 and stretches any generated arc into the arc stack 40. The catcher 50 catches the blade 55 and keeps it in an open state after the blade 55 is wide open. The current is finally interrupted when the arc is cooled down and extinguished in the arc chute. The magnetic tripping mechanism 60 releases the spring energy that instantaneously opens the circuit breaker 10 when the current is higher than a predetermined value, such as 10 times the current rating of the circuit breaker 10.

Figure 2:
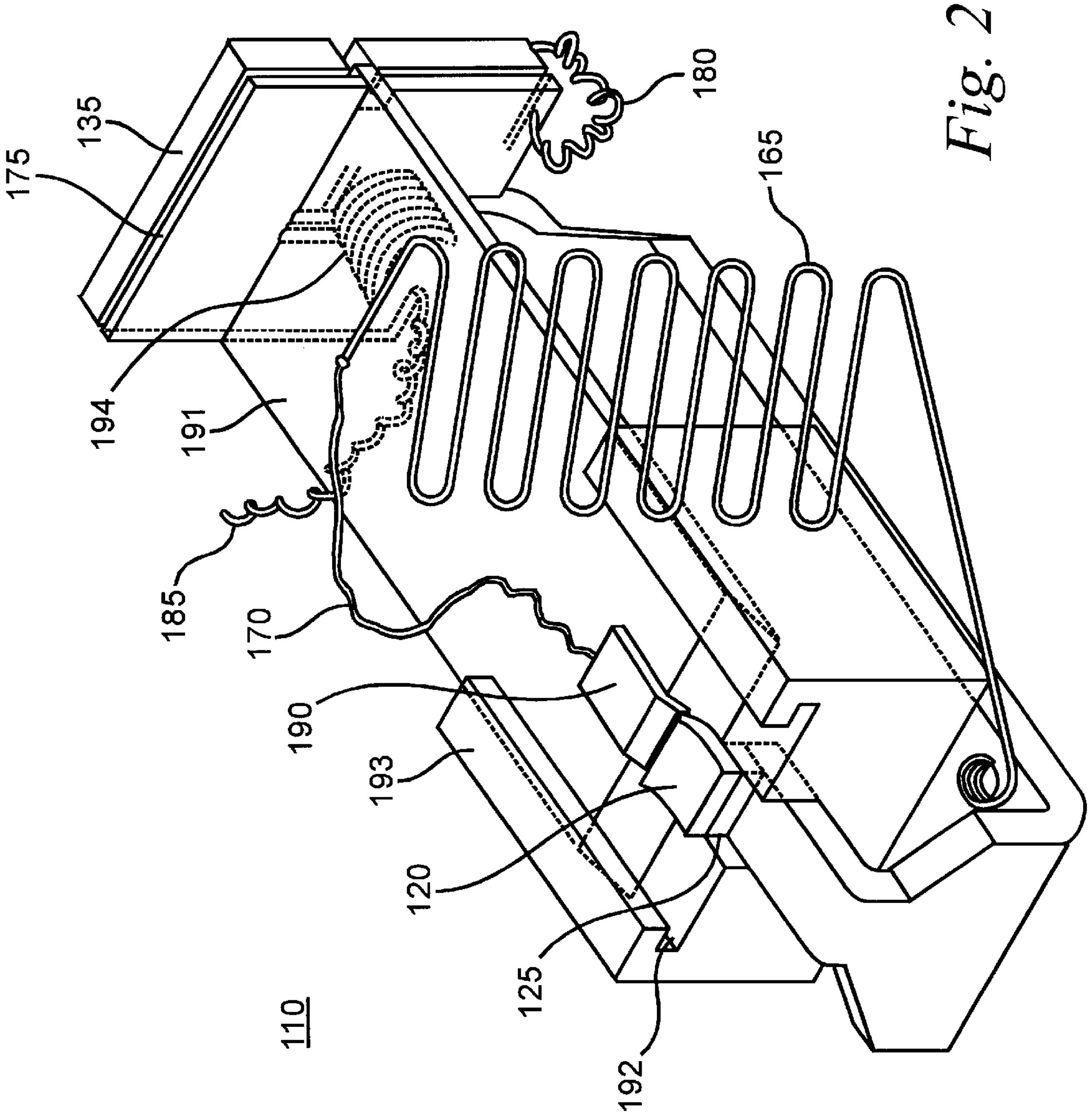
FIG. 2 illustrates a preferred embodiment of the present invention wherein a current responsive device generates a magnetic repulsive force to insert an insulating object between a pair of contacts thereby providing an electrical connection to a positive temperature coefficient resistivity element, which limits current and absorbs energy in a short circuit.

The circuit breaker in FIG. 2 comprises a component 165, preferably made from tungsten, connected at one end to the line terminal 135, which is fixedly connected to the circuit breaker 110, and to a flexible connector 170 at the other end. The serpentine shape of the component 165 is designed to reduce self-inductance. A movable driving plate 175 is placed at the end of the line terminal 135. A flexible connector 180 is used to electrically connect the driving plate 175 and the line terminal 135. An additional flexible connector 185 is connected from a power source (not shown) to the driving plate 175. The circuit breaker 110 contains three individual contacts: a stationary contact 125, which is connected to the line terminal 135, a movable contact 120, connected to a blade (not shown) and a secondary contact 190 which is mounted on an insulating object 191, preferably wedge shaped. The insulating object 191 is preferably made from a polymeric material such as a thermosetting plastic or thermoset material. An air gap exists between the movable contact 120 and the secondary contact 190. The flexible connector 170 electrically connects the secondary contact 190 on the insulating object 191 to component 165. The insulating object 191 is placed between a slot 192 of a supporter 193, which is made of a polymeric material and is placed on the line terminal 135. The driving plate 175 is attached to the insulating object 191 and is capable of driving the insulating object 191 between the movable contact 120 and stationary contact 125 with the use of an electrically generated magnetic repulsive force between the driving plate 175 and the line terminal 135. A compression spring 194 is placed between the driving plate 175 and the supporter 193, below the insulating object 191, to provide an opposing force relative to the magnetic repulsive force on the driving plate 175.

Under normal operations, current flows in from flexible connector 185 and through the driving plate 175. Current continues on to the line terminal 135 and through flexible connector 180. The current passes line terminal 135 to the stationary contact 125 and then to the movable contact 120. From the movable contact 120, current flows out of the breaker to the load. Since there is an air gap between the movable contact 120 and the secondary contact 190, no current flows to component 165 during normal operations and minimal overload situations. Current flow in the line terminal 135 and driving plate 175 provides a reverse loop of current. A constant repulsive force exists between the driving plate 175 and the line terminal 135 as long as there is current flow in both elements. The repulsive force is directionally proportional to the square of current. Under normal operations and small overload situations, the current is relatively small and the magnetic repulsive force is insignificant. In such situations, the magnetic repulsive force fails to overcome the force of the compression spring 194 and there is no movement of the insulating object 191. When the current increases over approximately 10 times the circuit breaker current rating, the repulsive force is large enough to overcome the force of the compression spring 194 thereby moving the insulating object 191. Under short circuit conditions, the large let-through current can generate a very large magnetic repulsive force on the driving plate 175. The force quickly pushes forward the insulating object 191 and secondary contact 190. The secondary contact 190 impacts the movable contact 120 and causes the separation between the movable contact 120 and the stationary contact 125. Within approximately one millisecond, the insulating object 191 covers the top area of the stationary contact 125 and simultaneously extinguishes any arc generated between the stationary contact 125 and the movable contact 120. The let-through current then flows through the secondary contact 190 to the component 165, which is heated. As a result of the positive temperature coefficient resistivity effect, during a short circuit, the resistance of the component 165 is capable of increasing approximately 15 times its room temperature value. The resistance added by component 165 limits the let-through current and absorbs a significant amount of the interruption energy created by the short circuit. The magnetic tripping mechanism (not shown) subsequently opens the moveable contact 120 and interrupts the short circuit.

Figure 3:
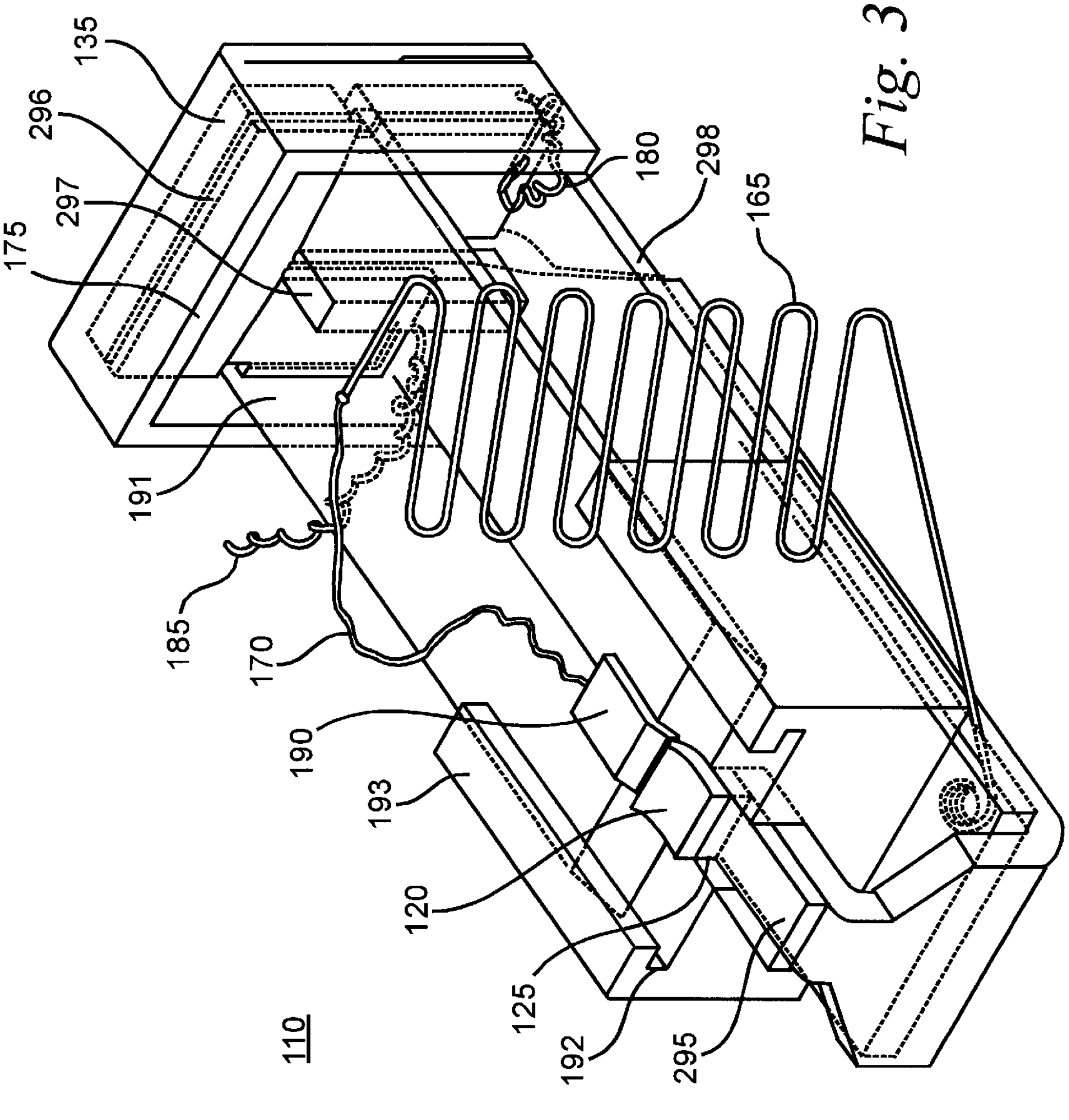
FIG. 3 illustrates an alternative embodiment of the present invention wherein a steel component is added to increase the magnetic repulsive force of the current responsive device and an insulating component is added to provide arc suppression upon insertion of the insulating object between the pair of contacts.

Any arc generated upon insertion of the insulating object 191 between the moveable contact 120 and the stationary contact 125 has the capability of progressing from the movable contact 120 to the line terminal 135 or to any exposed surface of the stationary contact 125 after the insulating object 191 covers the stationary contact 125. Therefore, an alternative embodiment of the present invention, as shown in FIG. 3, includes an insulation component 295 positioned adjacent the stationary contact 125 and between the slot 192 of the supporter 193 to suppress any such arc.

In order to increase the magnetic repulsive force on the driving plate 175, at least one steel component 296 is utilized. The steel component 296 may be positioned around the driving plate 175 and the line terminal 135. As shown in FIG. 3, steel components 296, 297 and 298 are non-current carrying components which confine the magnetic fields around the driving plate 175 and the line terminal 135 and thus increase the driving force on the insulating object 191. Utilization of at least one steel component can double the force on the driving plate 175 and also increase the blow off force on the moveable contact 120 upon occurrence of a short circuit.

Figure 4:
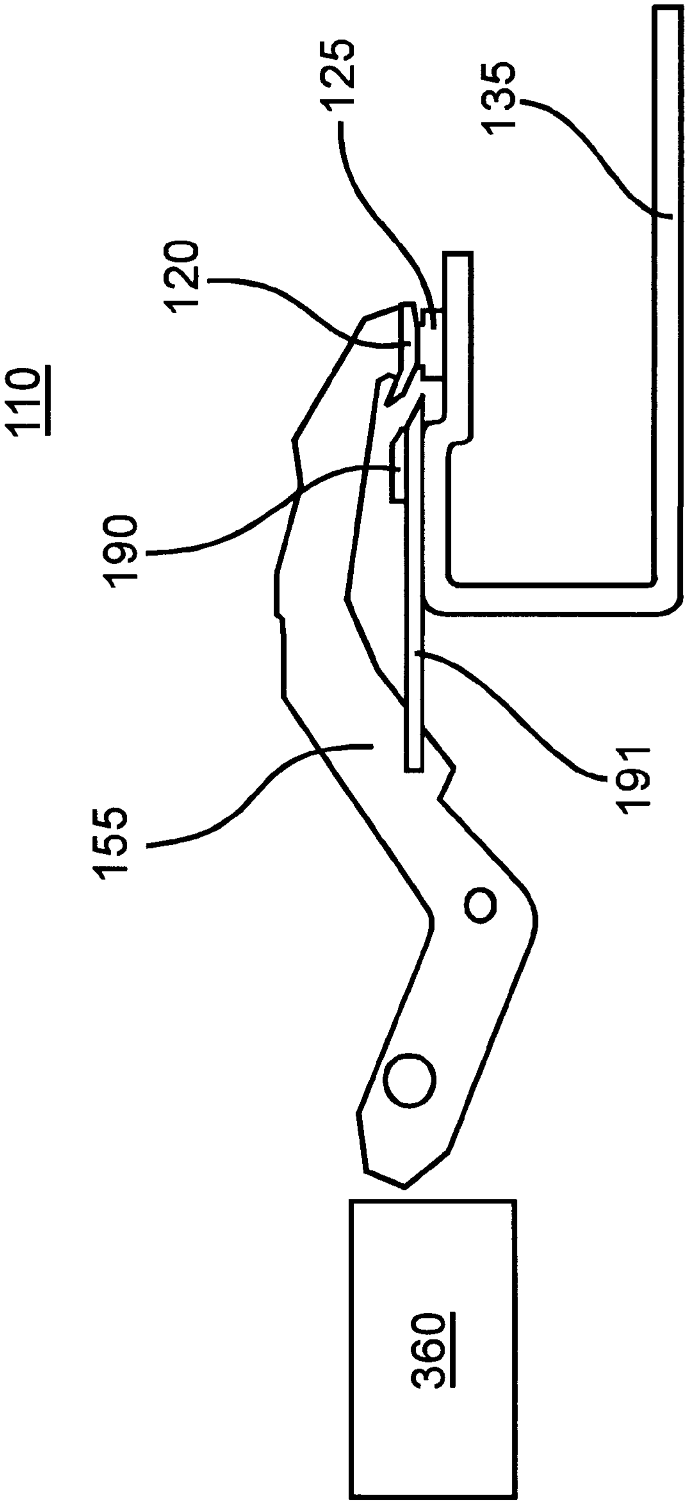
FIG. 4 illustrates an alternative embodiment of the present invention wherein the insulating object is mechanically linked to and actuates a magnetic tripping mechanism prior to extinguishing an arc between the contacts.

FIG. 4 shows another alternative embodiment of the present invention wherein a magnetic tripping mechanism 360 of the current limiting circuit breaker 110 is used to release spring energy that completely separates the moveable contact 120 from the stationary contact 125. An insulating object 191 is mechanically linked to the magnetic tripping mechanism 360 so that the magnetic tripping mechanism 360 is adapted to move the contacts 120, 125 from the closed position to the open position upon actuation of the insulating object 191. The insulating object 191 replaces any magnetic tripping actuator, thereby reducing the cost of the circuit breaker. When current flows through the circuit breaker and reaches a predetermined level, the insulating object 191 is displaced and separates the movable contact 120 and the stationary contact 125. Upon displacement, the insulating object 191 actuates the magnetic tripping mechanism 360 before it extinguishes the arc between the movable contact 120 and the stationary contact 125.

Several embodiments of the invention have been described. Various modifications and substitutions may be made thereto without departing from the spirit and scope of the invention. Accordingly, it is to be understood that the present invention has been described by way of illustrations and not by limitations.

We claim:

1. A circuit breaker for limiting the flow of electrical current in a line, comprising:

(a) a switch having a pair of contacts moveable with respect to each other defining an open position and a closed position;

(b) a first device responsive to current in the line adapted to move said switch from the closed position to the open position;

(c) a second device responsive to current in the line adapted to insert an insulating object between said pair of contacts; and (d) a positive temperature coefficient resistivity element electrically connected to said second device to limit current and absorb energy when said insulating object is inserted between said pair of contacts.

2. The circuit breaker of claim 1 wherein said second device comprises:

(a) a line terminal fixedly connected to the circuit breaker;

(b) a moveable driving plate electrically connected to said line terminal for generation of a magnetic repulsive force upon application of the electrical current in said line terminal and said moveable driving plate;

(c) a supporter adjacent said line terminal for receiving and supporting said insulating object; and (d) a spring between said supporter and said moveable driving plate for providing an opposing force relative to the magnetic repulsive force on said moveable driving plate.

3. The circuit breaker of claim 1 wherein said positive temperature coefficient resistivity element is electrically connected to said second device through a secondary contact mounted on said insulating object.

4. The circuit breaker of claim 1 wherein said positive temperature coefficient resistivity element is made of tungsten.

5. The circuit breaker of claim 1 wherein said positive temperature coefficient resistivity element has a substantially serpentine shape to reduce self-inductance.

6. The circuit breaker of claim 1 wherein said insulating object is a wedge.

7. The circuit breaker of claim 2 further comprising at least one steel component adjacent said driving plate and said line terminal to increase the magnetic repulsive force between said driving plate and said line terminal.

8. The circuit breaker of claim 2 wherein said supporter is made of a polymeric material.

9. The circuit breaker of claim 6 wherein said wedge is made of a polymeric material.

10. A circuit breaker for limiting the flow of electrical current in a line, comprising:

(a) a switch having a moveable contact and a stationary contact, said contacts moveable with respect to each other defining an open position and a closed position;

(b) a first device responsive to current in the line adapted to move said switch from the closed position to the open position;

(c) a second device responsive to current in the line adapted to insert an insulating object between said contacts;

(d) a positive temperature coefficient resistivity element electrically connected to said second device to limit current and absorb energy when said insulating object is inserted between said pair of contacts; and (e) an insulating component adjacent said stationary contact for arc suppression upon insertion of said insulating object between said contacts.

11. The circuit breaker of claim 10 wherein said second device comprises:

(a) a line terminal fixedly connected to the circuit breaker;

(b) a moveable driving plate electrically connected to said line terminal for generation of a magnetic repulsive force upon application of the electrical current in said line terminal and said moveable driving plate;

(c) a supporter adjacent said line terminal for receiving and supporting said insulating object; and (d) a spring between said supporter and said moveable driving plate for providing an opposing force relative to the magnetic repulsive force on said moveable driving plate.

12. The circuit breaker of claim 10 wherein said positive temperature coefficient resistivity element is electrically connected to said second device through a secondary contact mounted on said insulating object.

13. The circuit breaker of claim 10 wherein said positive temperature coefficient resistivity element is made of tungsten.

14. The circuit breaker of claim 10 wherein said positive temperature coefficient resistivity element has a substantially serpentine shape to reduce self-inductance.

15. The circuit breaker of claim 10 wherein said insulating object is a wedge.

16. The circuit breaker of claim 11 further comprising at least one steel component adjacent to said driving plate and said line terminal to increase the magnetic repulsive force between said driving plate and said line terminal.

17. The circuit breaker of claim 11 wherein said supporter is made of a polymeric material.

18. The circuit breaker of claim 15 wherein said wedge is made of a polymeric material.

19. A circuit breaker for limiting the flow of electrical current in a line, comprising:

(a) a switch having a pair of contacts moveable with respect to each other defining an open position and a closed position;

(b) a first device responsive to current in the line adapted to insert an insulating object between said pair of contacts;

(c) a second device adapted to move said switch from the closed position to the open position upon actuation of said first device; and (d) a positive temperature coefficient resistivity element electrically connected to said first device to limit current and absorb energy when said insulating object is inserted between said pair of contacts.

20. A circuit breaker for limiting the flow of electrical current in a line, comprising:

(a) a switch having a pair of contacts moveable with respect to each other defining an open position and a closed position;

(b) a first device responsive to current in the line adapted to move said switch from the closed position to the open position;

(c) a second device responsive to current in the line adapted to insert an insulating object between said pair of contacts;

(d) a positive temperature coefficient resistivity element electrically connected to said second device to limit current and absorb energy when said insulating object is inserted between said pair of contacts; and (e) a secondary contact positioned on said insulating object to provide an electrical connection between said second device and said positive temperature coefficient resistivity element upon insertion of said insulating object between said pair of contacts.

21. A circuit breaker for limiting the flow of electrical current in a line, comprising:

(a) a switch having a pair of contacts moveable with respect to each other defining an open position and a closed position;

(b) a first device responsive to current in the line adapted to move said switch from the closed position to the open position;

(c) a second device responsive to current in the line adapted to insert an insulating object between said pair of contacts;

(d) a positive temperature coefficient resistivity element electrically connected to said second device to limit current and absorb energy when said insulating object is inserted between said pair of contacts; and (e) said positive temperature coefficient resistivity element is electrically connected to said second device through a secondary contact mounted on said insulating object.

* * * * *